(12) United States Patent
Enomoto et al.

(10) Patent No.: US 9,316,555 B2
(45) Date of Patent: Apr. 19, 2016

(54) COLD CATHODE IONIZATION VACUUM GAUGE AND INNER WALL PROTECTION MEMBER

(71) Applicant: CANON ANELVA CORPORATION, Kawasaki-shi (JP)

(72) Inventors: Itaru Enomoto, Kawasaki (JP); Hideo Mano, Kawasaki (JP)

(73) Assignee: Canon Anelva Corporation, Kawasaki-shi (JP)

( * ) Notice: Subject to any disclaimer, the term of this patent is extended or adjusted under 35 U.S.C. 154(b) by 100 days.

(21) Appl. No.: 14/260,545

(22) Filed: Apr. 24, 2014

(65) Prior Publication Data

US 2014/0368210 A1  Dec. 18, 2014

(30) Foreign Application Priority Data

Jun. 13, 2013  (JP) ................. 2013-124495

(51) Int. Cl.
| | |
|---|---|
| *G01L 21/34* | (2006.01) |
| *G01L 21/32* | (2006.01) |
| *G01L 21/30* | (2006.01) |
| *H01J 41/04* | (2006.01) |
| *H01J 41/06* | (2006.01) |

(52) U.S. Cl.
CPC ............. *G01L 21/34* (2013.01); *G01L 21/30* (2013.01); *G01L 21/32* (2013.01); *H01J 41/04* (2013.01); *H01J 41/06* (2013.01)

(58) Field of Classification Search
CPC ......... G01L 21/34; G01L 21/32; G01L 21/30; H01J 41/04; H01J 41/06
USPC ....................................... 324/460
See application file for complete search history.

(56) References Cited

U.S. PATENT DOCUMENTS

| | | | | |
|---|---|---|---|---|
| 3,676,771 | A * | 7/1972 | Loup | G01L 21/12 324/460 |
| 5,300,890 | A * | 4/1994 | Haas | H01J 41/04 250/389 |
| 5,317,270 | A * | 5/1994 | Lethbridge | G01L 21/34 313/247 |
| 8,384,391 | B2 | 2/2013 | Kawasahi et al. | |
| 8,729,465 | B2 * | 5/2014 | Watanabe | G01L 21/32 250/294 |
| 2005/0140375 | A1 * | 6/2005 | Liu | G01L 21/34 324/460 |
| 2006/0012373 | A1 * | 1/2006 | Edelmann | H01J 41/06 324/460 |
| 2010/0164502 | A1 * | 7/2010 | Kawasaki | G01L 21/34 324/460 |
| 2010/0259273 | A1 * | 10/2010 | Kawasaki | H01J 41/06 324/460 |
| 2013/0106431 | A1 * | 5/2013 | Liu | H01J 41/06 324/460 |

FOREIGN PATENT DOCUMENTS

| | | |
|---|---|---|
| JP | 10-19711 A | 1/1998 |
| JP | 2008-304361 A | 12/2008 |

* cited by examiner

*Primary Examiner* — Jermele M Hollington
*Assistant Examiner* — Christopher McAndrew
(74) *Attorney, Agent, or Firm* — Fitzpatrick, Cella, Harper & Scinto (57) ABSTRACT

A cold cathode ionization vacuum gauge, including: two electrodes disposed such that one of the electrodes is surrounded by the other electrode to thereby form a discharge space therebetween; and an electrode protection member disposed in the discharge space and configured to protect an inner wall surface of the other electrode, wherein the electrode protection member has electric conductivity and is elastically deformed along a shape of the inner wall surface to be electrically connected to the other electrode.

8 Claims, 6 Drawing Sheets

COLD CATHODE IONIZATION VACUUM GAUGE AND INNER WALL PROTECTION MEMBER

CROSS-REFERENCES TO RELATED APPLICATIONS

This application is based upon and claims the benefit of priority of the prior Japanese Patent Application No. 2013-124495, filed Jun. 13, 2013. The contents of the aforementioned application are incorporated herein by reference in their entireties.

BACKGROUND OF THE INVENTION

1. Field of the Invention

The present invention relates to a cold cathode ionization vacuum gauge and an inner wall protection member for protecting the inner wall of a cathode of the cold cathode ionization vacuum gauge.

2. Description of the Related Art

A cold cathode ionization vacuum gauge is a device which measures the pressure in a vacuum chamber constituting a vacuum processing apparatus by inducing ionization of gas through self-discharge between a anode and a cathode. Heretofore, a Penning type cold cathode ionization vacuum gauges, a magnetron type cold cathode ionization vacuum gauges, and an inverted magnetron type cold cathode ionization vacuum gauge have been known (see Patent Document 1). The magnetron type cold cathode ionization vacuum gauge and the inverted magnetron type cold cathode ionization vacuum gauge are particularly suitable for measurement in a high vacuum range since they have structures that offer high electron trap efficiency and are capable of stable and continuous discharge even in a high vacuum range.

Meanwhile, it is known that a cold cathode ionization vacuum gauge causes a self-sputtering effect during use and thereby produces an insulative film mainly containing the material of a gauge head container over the inner wall of this container. The insulative film produced on the inner wall possibly inhibits the discharge and deteriorates the pressure measurement accuracy. For this reason, regular maintenance is required.

In view of this, in a cold cathode ionization vacuum gauge described in Patent Document 2, adhesion of an insulative film to the inner wall of a cathode (gauge head container) is prevented by a tubular spacer mounted in such a way as to cover the inner side of the gauge head container. Moreover, the maintainability is improved by a structure in which ignition assist members for improving the discharge characteristics are sandwiched between and supported by the cylindrical spacer and metal blocks. The tubular spacer is made of a metal material such as stainless steel.

The related art is as follows.

[Patent Document 1] Japanese Patent Application Publication No. Hei 10-19711

[Patent Document 2] Japanese Patent Application Publication No. 2008-304361

As described above, in the technique disclosed in Patent Document 2, the tubular spacer is provided to protect the inner wall of the gauge head container from a sputtering effect by plasma generated in a discharge space and from production of adhering matters by the sputtering. Specifically, the spacer is provided in such a way as to cover the inner wall of the gauge head container serving as a cathode and having a hollow portion, and a shaft electrode serving as an anode is inserted in a hollow portion of the spacer. Thus, the hollow portion of the tubular spacer serves as the discharge space. However, the spacer is required to have high rigidity and its thickness is therefore large. The thicker the spacer, the smaller the discharge space becomes. Hence, in order to secure a desired size of a discharge space excluding the spacer, the diameter of the gauge head container must be increased with the thick spacer taken into consideration. This in turn leads to increase in size of the apparatus. In other words, in order to obtain a discharge space of a predetermined size, the size of the gauge head container needs to be increased by the size of the thick spacer.

Moreover, in a case where the diameter of the tubular spacer is smaller than its design value, backlash of the spacer sometimes occurs. In this case, the spacer must be aligned by using an O-ring or the like to fill a gap, which is a cause of the backlash, formed between the spacer and the inner wall of the gauge head container.

SUMMARY OF THE INVENTION

The present invention has been made in view of the above problems, and an object thereof is to provide a cold cathode ionization vacuum gauge and an inner wall protection member capable of forming a discharge space of a predetermined size while reducing the increase in size of an apparatus, and also of easily reducing backlash of the member for reducing adhesion of matters to the inner wall of a gauge head container.

To achieve the above object, a first aspect of the present invention provides a cold cathode ionization vacuum gauge including: two electrodes disposed such that one of the electrodes is surrounded by the other electrode to thereby form a discharge space therebetween; and an electrode protection member disposed in the discharge space and configured to protect an inner wall surface of the other electrode, in which the electrode protection member has electric conductivity and is elastically deformed along a shape of the inner wall surface to be electrically connected to the other electrode.

A second aspect of the present invention provides an electrode protection member, in which: the electrode protection member is disposed in a discharge space between two electrodes, the two electrodes being disposed such that one of the electrodes is surrounded by the other electrode to thereby form the discharge space; the electrode protection member is configured to protect an inner wall surface of the other electrode; the electrode protection member has electric conductivity; and the electrode protection member is elastically deformed along a shape of the inner wall surface to be electrically connected to the other electrode.

According to the present invention, it is possible to form a discharge space of a predetermined size while reducing the increase in size of an apparatus, and also to easily reduce backlash of the member for reducing adhesion of matters to the inner wall of a gauge head container.

DESCRIPTION OF THE EMBODIMENTS

Hereinbelow, modes for carrying out the invention will be described with reference to the drawings. Members, arrangements, and the like to be described below are mere examples embodying the present invention and are not intended to limit the present invention. Various modifications can be made within the spirit of the present invention as a matter of course.

First Embodiment

Figure 1:
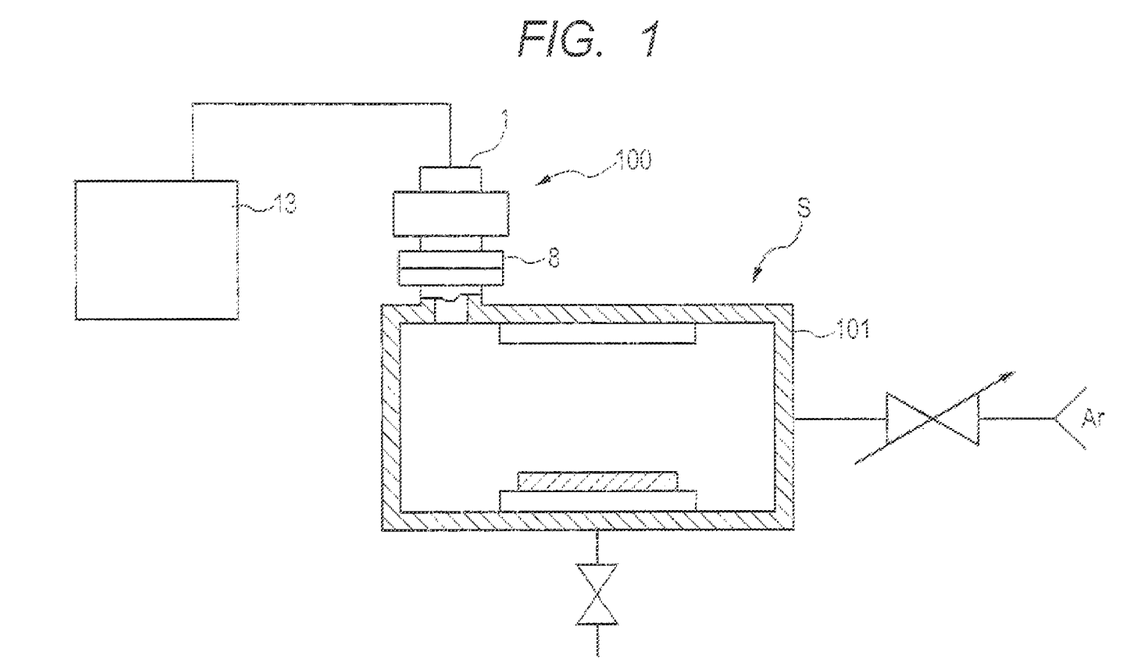
FIG. 1 is a schematic view showing a vacuum processing apparatus including a cold cathode ionization vacuum gauge according to an embodiment of the present invention.
Figure 2:
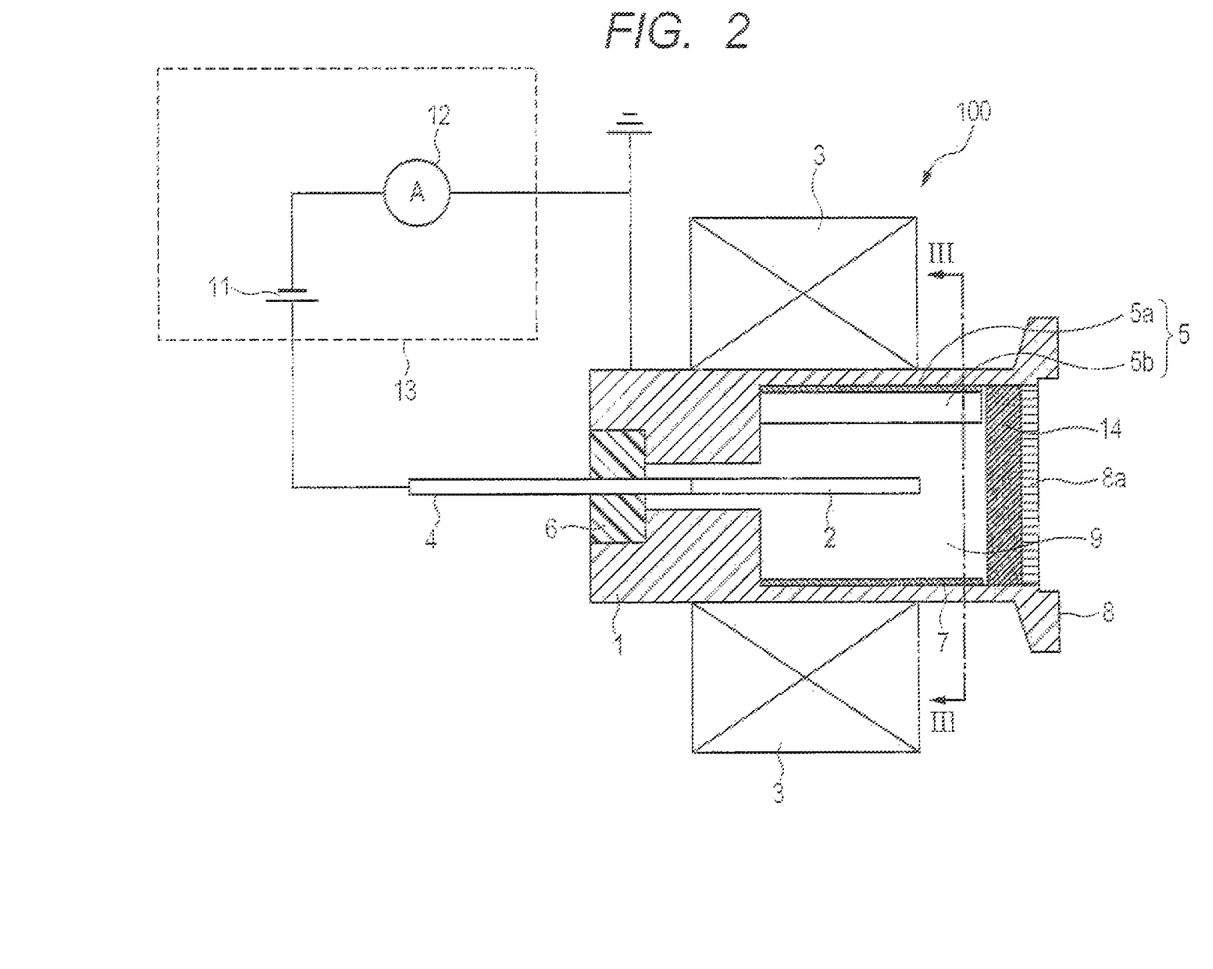
FIG. 2 is a cross-sectional view showing the cold cathode ionization vacuum gauge according to the embodiment of the present invention.
Figure 3:
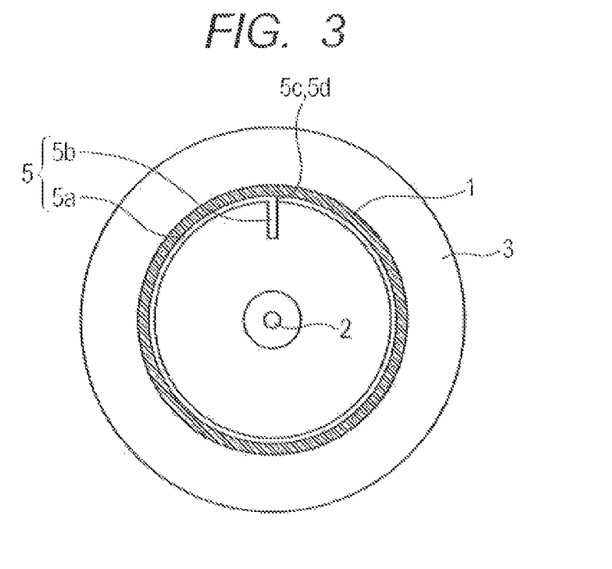
FIG. 3 is a schematic cross-sectional view taken along line III-III in FIG. 2 and seen in the direction of arrows III in FIG. 2.
Figure 4A:
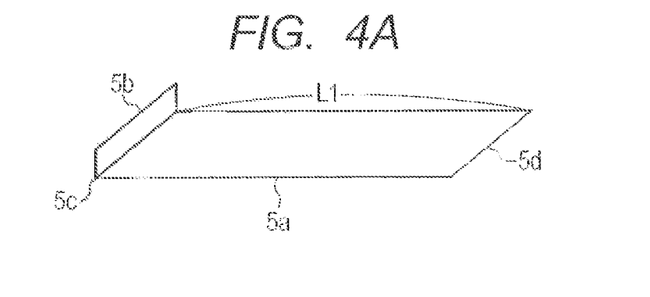
FIGS. 4A and 4B are explanatory views of an inner wall protection member according to the embodiment of the present invention.
Figure 4B:
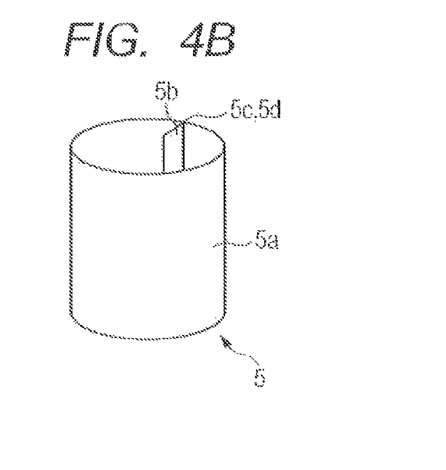
Figure 5A:
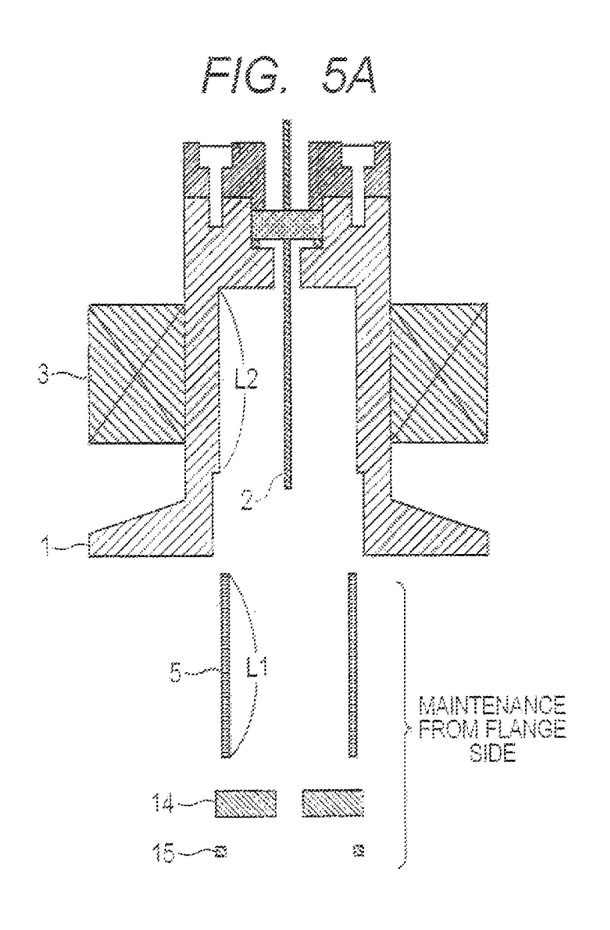
FIGS. 5A and 5B are explanatory views showing a procedure to attach the inner wall protection member according to the embodiment of the present invention to a gauge head container.
Figure 5B:
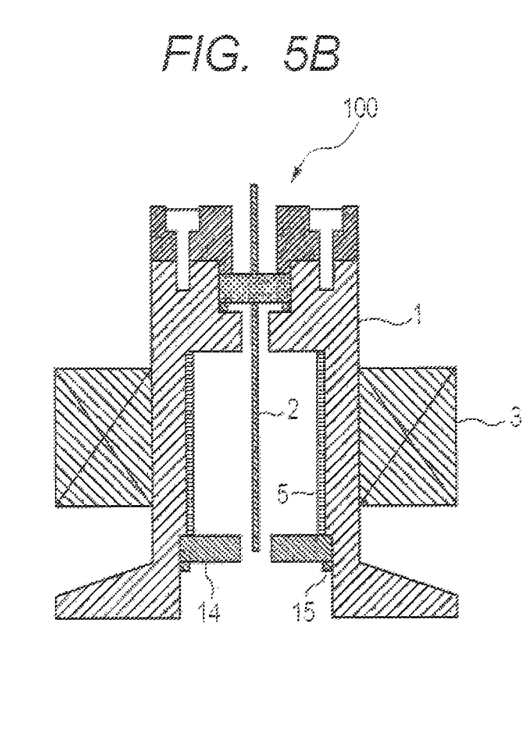
Figure 6A:
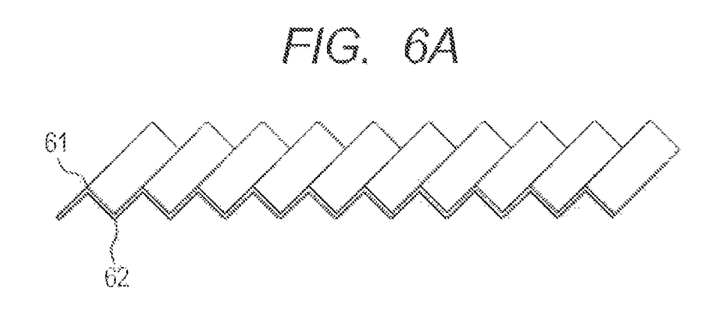
FIGS. 6A and 6B are views showing another example of the configuration of the inner wall protection member according to the embodiment of the present invention.
Figure 6B:
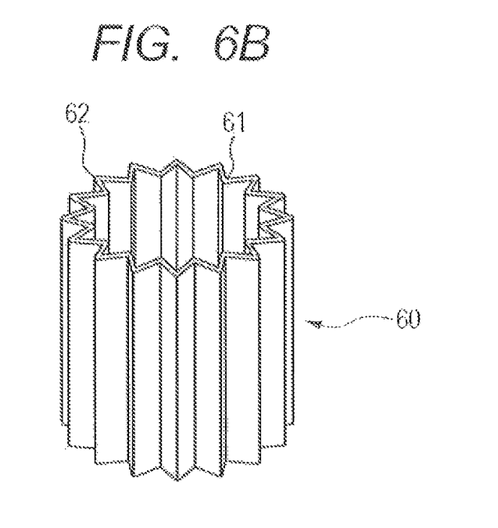

FIGS. 1 to 6B are views for describing a vacuum processing apparatus and a cold cathode ionization vacuum gauge attached thereto according to a first embodiment of the present invention. Specifically, FIG. 1 is a schematic cross-sectional view of the vacuum processing apparatus including the cold cathode ionization vacuum gauge according to the first embodiment of the present invention; and FIG. 2 is a schematic cross-sectional view of the cold cathode ionization vacuum gauge according to the present invention. Moreover, FIG. 3 is a cross-sectional view seen from line III-III in FIG. 2 (a view seen in the direction of arrows III in FIG. 2); FIGS. 4A and 4B are schematic views of an inner wall protection member; FIGS. 5A and 5B are explanatory views showing a procedure to attach the inner wall protection member to a gauge head container; and FIGS. 6A and 6B are views showing another example of the configuration of the inner wall protection member.

As shown in FIG. 1, a cold cathode ionization vacuum gauge 100 according to the present embodiment is attached to a wall surface of a vacuum chamber 101 provided to a vacuum processing apparatus S. Specifically, the cold cathode ionization vacuum gauge 100 is attached to an opening portion of the wall surface of the vacuum chamber 101 in an airtight manner. Note that in the drawing, reference numeral 1 denotes a gauge head container (cathode) of the cold cathode ionization vacuum gauge 100, reference numeral 8 denotes a connection flange, and reference numeral 13 denotes a vacuum gauge operation circuit.

In the specification of this application, a sputtering apparatus will be described as an example of the vacuum processing apparatus S, but the present invention is not limited to this case. The cold cathode ionization vacuum gauge of the present invention is preferably applicable, for example, to film forming apparatuses such as a PVD apparatus and a CVD apparatus, as well as an ashing apparatus, a dry etching apparatus, and so on.

FIG. 2 is a schematic cross-sectional view of the cold cathode ionization vacuum gauge according to the present embodiment. FIG. 3 is a cross-sectional view taken along line III-III in FIG. 2 and seen in the direction of arrows III in FIG. 2. Note that the same parts in FIGS. 2 and 3 as those in FIG. 1 are denoted by the same reference numerals. The cold cathode ionization vacuum gauge 100 according to the present embodiment is an inverted magnetron vacuum gauge and includes, as its constituent components, the gauge head container 1 as a cathode (negative pole), a rod-shaped anode 2 (positive pole), and a magnet 3 as magnetic means for generating a magnetic field disposed on the outer periphery of the gauge head container 1 as the cathode.

The gauge head container 1 (cathode) is a metal member of a substantially cylindrical shape or a substantially tubular shape, and a discharge space 9 is formed in a space surrounded by an inner wall surface 7 of the hollow portion of the gauge head container (cathode) 1. One end portion of the gauge head container 1 on the discharge space 9 side is opened while the other end portion is sealed by an insulating member 6. The connection flange 8 and a filter 8a are provided at the open end portion on the discharge space 9 side. The filter 8a is made of stainless mesh or the like, and the insulating member 6 is made of an insulating stone such as alumina ceramic. A current leading rod 4 penetrates through and is fixed to the insulating member 6 in an airtight manner. Moreover, a pole piece 14 configured to adjust the magnetic field is disposed at a position adjacent to the filter 8a.

With the connection flange 8 of the gauge head container (cathode) 1 attached to the opening portion of the vacuum chamber 101, air can flow between the space inside the vacuum chamber 101 and the discharge space 9 inside the gauge head container (cathode) 1 through the filter 8a. In this state, the pressure in the space inside the vacuum chamber 101 can be measured. The magnet is attached in such a ring shape as to surround the outer periphery of the gauge head container (cathode) 1. A permanent magnet such as a ferrite magnet is preferably used as the magnet 3.

The anode 2 is a rod-shaped anode electrode, and is arranged in the discharge space 9 formed inside the gauge head container (cathode) 1 and has one end portion thereof connected to the current leading rod 4. On the outside of the gauge head container (cathode) 1, the current leading rod 4 is connected to the vacuum gauge operation circuit 13. The vacuum gauge operation circuit 13 includes a power source 11 configured to apply voltage and a discharge current detection unit 12 configured to measure discharge current flowing in the vacuum gauge operation circuit 13. Moreover, an inner wall protection member 5 is provided inside the gauge head container 1 along its inner wall as an electrode protection member configured to protect the inner wall surface 7.

FIGS. 4A and 4B are enlarged views of the inner wall protection member 5. FIG. 4A is a perspective view of the inner wall protection member 5 before attached to the gauge head container (cathode) 1 (e.g., a stored state), whereas FIG. 4B is a perspective view of the inner wall protection member 5 after attached to the gauge head container (cathode) 1. FIGS. 4A and 4B are views in which the members other than the inner wall protection member 5 are excluded. The inner wall protection member 5 is a member having electric conductivity and being capable of elastic deformation along the shape of the inner wall surface 7 of the gauge head container (cathode) 1. A thin plate of a highly corrosion resistant metal, for example, a stainless steel such as SUS304, a nickel alloy, or a high melting point material can be used as the inner wall protection member 5. As shown in FIG. 4A, the inner wall protection member 5 has a plate-shaped protection portion 5a and a trigger electrode portion 5b extending in a direction normal to the surface of the protection portion 5a at one end 5c of the protection portion 5a.

Since the inner wall protection member 5 is a plate-shaped material having spring properties (elasticity), it is deformed in conformity with the shape of the inner wall surface 7 of the gauge head container 1 as shown in FIG. 4B and then inserted into the gauge head container 1. Specifically, the protection portion 5a is deformed such that the one end 5c of the protection portion 5a and the other end 5d of the protection portion 5a come into contact with each other, to thereby form a cylindrical shape with the trigger electrode portion 5b situated inside. The inner wall protection member 5 in this state is then inserted into the hollow portion of the gauge head container (cathode) 1. As a result, the inner wall protection member 5 becomes locked on the inner side (inner wall surface 7) of the gauge head container 1 by force (energizing force) which causes the protection portion 5a to spread due to restoring force generated by its elasticity. In other words, the inner wall protection member 5 covers the wall surface (inner wall surface 7) of the gauge head container (cathode) 1 facing the discharge space 9 surrounded by the gauge head container (cathode) 1, and is locked on the gauge head container (cathode) 1 by the above-mentioned energizing force while elastically deformed in the circumferential direction of the inner wall surface 7. Thus, by the above-mentioned energizing force, the inner wall protection member 5 is brought into contact with the inner wall surface 7, so that the inner wall protection member 5 is electrically connected to the gauge head container (cathode) 1. As a result, as shown in FIG. 3, the inner wall surface 7 of the gauge head container 1 is covered with the inner wall protection member 5, thereby making it possible to prevent or reduce adhesion of an insulative matter to the inner wall surface 7 caused by a self-sputtering effect. Moreover, in this locked state, the energizing force from the inner wall protection member 5 is applied to the inner wall surface 7 spontaneously and constantly, thereby making it possible to bring the inner wall protection member 5 and the inner wall surface 7 into close contact with each other without any gap therebetween or, if there is any gap, reduce the gap. A film of carbon nanotubes, synthetic diamond, or the like may be formed on the surface of the inner wall protection member 5. In this way, a trigger function that assists start of discharge can be increased.

(Detailed Description of Inner Wall Protection Member)

The inner wall protection member 5 has the protection portion 5a to be disposed in such a way as to cover the inner wall surface 7 of the gauge head container 1, and the trigger electrode portion 5b being a protruding member provided at an end portion of the protection portion 5a. Plasma is generated by discharge occurring between the gauge head container (cathode) 1 and the anode 2, and the trigger electrode portion 5b is a member for facilitating the start of this discharge. This trigger electrode portion 5b is connected to the protection portion 5a in such a way as to protrude toward the anode 2 when the inner wall protection member 5 is locked on the inner wall surface 7 (when the inner wall protection member 5 is covering the inner wall surface 7). Meanwhile, the protection portion 5a and the trigger electrode portion 5b may be the same member (a single integral member) or separate members. In the case where the protection portion 5a and the trigger electrode portion 5b are the same member, the trigger electrode portion 5b may be formed by folding an end portion of a SUS304 plate, for example. In the case where the protection portion 5a and the trigger electrode portion 5b are separate members, a trigger electrode portion 5b having electric conductivity may be provided on a region of the surface of a protection portion 5a having electric conductivity and capable of elastic deformation along the shape of the inner wall surface 7 of the gauge head container (cathode) 1, the region being, for example, at least one end portion or a portion between the opposite end portions.

Needless to say, the trigger electrode portion 5b does not have to be provided if the inner wall protection member 5 is only to protect the inner wall surface 7.

In the present embodiment, the protection portion 5a is a rectangular plate-shaped member and made of a high melting point material having high electric conductivity. The thickness of the protection portion 5a is about 0.1 mm but only needs be able to provide such strength that the operator can easily deform the protection portion 5a. In other words, the protection portion 5a is required to have electric conductivity and capable of elastic deformation. Although the protection portion 5a is a rectangular flat plate, openings may be provided in the protection portion 5a so as to increase the speed of air evacuation from regions between the inner wall of the gauge head container 1 and the inner wall protection member 5.

The trigger electrode portion 5b protrudes toward the anode 2 when the inner wall protection member 5 is locked on the gauge head container (cathode) 1. The trigger electrode portion 5b offers a higher electron extraction effect at low voltage when its tip facing the anode 2 is sharper. Also, the thickness of a portion of the trigger electrode portion 5b facing the anode 2 is preferably about 100 μm, and particularly a tip portion of the trigger electrode portion 5b facing the anode 2 is desirably formed even thinner. This is because a smaller thickness offers a higher electron extraction effect at low voltage. Moreover, the number of trigger electrode portions 5b is not limited to one, and multiple trigger electrode portions 5b may be provided. In this case, in FIG. 4A, for example, another trigger electrode portion(s) 5b may be provided on the protection portion 5a at a position(s) different from that of the trigger electrode portion 5b provided at the one end 5c of the protection portion 5a.

In the present embodiment, the trigger electrode portion 5b of the inner wall protection member 5 is one end portion of the protection portion 5a folded at a right angle (in the direction normal to the surface of the protection portion 5a), and is provided in such a way as to extend toward the center of the discharge space 9 from the protection portion 5a when the inner wall protection member 5 is attached to the gauge head container (cathode) 1. For this reason, discharge can occur at a region near the center of the discharge space 9, making the start of the discharge more reliable. Note that the direction in which the trigger electrode portion 5b extends is not limited to the normal direction mentioned above. In the present embodiment, a discharge trigger only needs to be formed closer to the center of the discharge space 9 than from the gauge head container (cathode) 1. As long as the trigger electrode portion 5b extends in a direction having a predetermined angle with respect to the surface direction of the protection portion 5a, discharge can be started inward (the anode 2 side) of the gauge head container (cathode) 1. Thus, as long as a direction having a predetermined angle with respect to the surface direction of the protection portion 5a is a direction that can achieve the above arrangement, that direction can be employed as the direction in which the trigger electrode portion 5b extends. In other words, the trigger electrode portion 5b only needs to extend inside the hollow portion of the gauge head container (cathode) 1 when the inner wall protection member 5 is attached to the gauge head container (cathode) 1. Moreover, with the trigger electrode portion 5b formed in a narrow plate shape, it is possible to minimize unevenness in electric fields inside the discharge space 9 and thus to minimize the influence of the placement of the trigger electrode portion 5b on the discharge characteristics.

Although the tip of the above-described trigger electrode portion 5b facing the anode 2 is formed straight, a protrusion(s) may be formed at the tip. For example, the configuration may be such that one or more protrusions are aligned in the axial direction (longitudinal direction) of the anode 2 when the inner wall protection member 5 is attached to the gauge head container (cathode) 1. Here, it is desirable to form multiple protrusions on the trigger electrode portion 5b so that discharge can be induced in a short period of time even when sputtered films and products are adhered to the inside of the vacuum gauge head due to a long-term use.

(Procedure to Attach and Detach Inner Wall Protection Member)

FIGS. 5A and 5B are explanatory views showing a procedure to attach the inner wall protection member 5 to the gauge head container 1. As shown in FIG. 5A, a structure is prepared in which the anode 2 is inserted in the hollow portion of the gauge head container (cathode) 1, and the magnet 3 is provided in such a way as to surround a space that will be the discharge space 9. Then, the inner wall protection member 5 stored in the state in FIG. 4A is deformed as shown in FIG. 4B and inserted into the gauge head container 1, from which the pole piece 14 on the flange side is detached, so that the inner wall protection member 5 is attached to the gauge head container 1. Then, the pole piece 14 and a C-ring 15 are provided, whereby the cold cathode ionization vacuum gauge 100 is formed as shown in FIG. 5B. Note that a longitudinal length L1 of the inner wall protection member 5 and a longitudinal length L2 of the discharge space 9 inside the hollow portion of the gauge head container 1 may be set to the same length. In this way, the positioning of the inner wall protection member 5 can be done easily.

As described above, in the present embodiment, the inner wall protection member 5 having electric conductivity and elastically deformed along the shape of the inner wall surface 7 to be electrically connected to the gauge head container (cathode) 1, is used so that adhesion of particles resulting from a self-sputtering effect to the inner wall surface 7 can be reduced. In other words, in the present embodiment, the member that protects the inner wall surface 7 is not required to be rigid but is instead required to be elastically deformable. Thus, the thickness of the inner wall protection member 5 does not need to be large and the thickness can instead be small. Since the thickness of the inner wall protection member 5 which actually defines the discharge space 9 can be small, the increase in size of the gauge head container (cathode) 1 can be reduced when a discharge space of a predetermined size is to be formed. Accordingly, the increase in size of the apparatus can be reduced.

Moreover, even if a space (gap) is formed between the inner wall protection member 5 and the inner wall surface 7 when the inner wall protection member 5 is deformed from the state in FIG. 4A to the state in FIG. 4B and inserted in the hollow portion of the gauge head container (cathode) 1, the inner wall protection member 5 spreads outward due to the energizing force resulting from the elastic deformation of the protection portion 5a and thereby eliminates the space. As a result, there is formed a region at which the inner wall protection member 5 and the inner wall surface 7 contact each other. At this contact region, the inner wall protection member 5 applies the above-mentioned energizing force to the inner wall surface 7. Since the inner wall protection member 5 elastically deformed in a cylindrical shape tries to spread radially from the center of the cylinders, the force is applied to the inner wall surface 7 over the entire area in the circumferential direction of the hollow portion of the gauge head container 1, and the force holds the inner wall protection member 5 on the gauge head container (cathode) 1. In other words, in the present embodiment, the energizing force resulting from the elastic deformation functions also as holding force for holding the inner wall protection member 5 on the inner wall surface 7. As described above, in the present embodiment, the inner wall protection member 5 spontaneously comes into contact with the inner wall surface 7, and the inner wall protection member 5 applies energizing force as its holding force to the inner wall surface 7. Accordingly, the inner wall protection member 5 can be stably locked on the inner wall surface 7. That is, backlash of the inner wall protection member 5 attached to the gauge head container (cathode) 1 can be reduced without providing any member for reducing the backlash.

Moreover, in the present embodiment, when the inner wall protection member 5 deformed as shown in FIG. 4B is simply inserted in a region inside the gauge head container (cathode) 1 corresponding to the discharge space 9, the inner wall protection member 5 spreads due to its elastic deformation and thereby spontaneously aligns itself. Thus, even in a case where the longitudinal length L1 differs from one inner wall protection member 5 to another due to manufacturing errors or the like, each inner wall protection member 5 can be well locked on the inner wall surface 7 with the above-mentioned backlash being reduced.

Meanwhile, the cold cathode ionization vacuum gauge described in Patent Document 2 requires high dimensional accuracy for its constituent components because if a gap is formed between the cylindrical spacer and metal blocks and the inner side of the gauge head container, gas from the gap deteriorates the measurement accuracy. Thus, there is a problem in that it is difficult to achieve cost reduction.

In contrast, in the present embodiment, the inner wall protection member 5 locked on the gauge head container (cathode) 1 as shown in FIG. 4B tries to spread constantly. Thus, the inner wall protection member 5 functions in such a way as to reduce the gap between the inner wall protection member 5 and the inner wall surface 7. Accordingly, it is possible to bring the inner wall protection member 5 into close contact with the inner wall surface 7 and thereby reduce formation of accumulated gas which is a cause of the deterioration in measurement accuracy. Moreover, as mentioned above, the inner wall protection member 5, as a result of its spreading action, stops the spreading action at a stable position spontaneously. Thus, the inner wall protection member 5 spontaneously positions itself to a position optimum for its dimension (length L1), even when the dimensional accuracy of the inner wall protection member 5 is not high. Accordingly, the inner wall protection member 5 can be well locked even when the dimensional accuracy of the inner wall protection member 5 is not high, and therefore the cost can be reduced.

Second Embodiment

FIGS. 6A and 6B are another example of the configuration of the inner wall protection member. This inner wall protection member can be used in place of the inner wall protection member illustrated in FIGS. 4A and 4B. FIG. 6A is a perspective view of an inner wall protection member 60 before attached so the gauge head container (cathode) 1 (e.g., a stored state), whereas FIG. 6B is a perspective view of the inner wall protection member 60 after attached to the gauge head container (cathode) 1. FIGS. 6A and 6B are views in which the members other than the inner wall protection member 60 are excluded. This inner wall protection member 60 is formed by folding a rectangular thin plate member at multiple spots, the plate member having electric conductivity and being elastically deformable.

Among the folded portions of the inner wall protection member 60, portions 61 that come near the anode 2 when the inner wall protection member 60 is deformed as shown in FIG. 6B work as trigger electrode portions. Moreover, in FIG. 6B, among the folded portions, portions 62 facing outward come into contact with the gauge head container (cathode) 1. Specifically, the portions 62 are protruding portions that come into contact with the inner wall surface 7 when the inner wall protection member 60 is locked on the gauge head container (cathode) 1. In the present embodiment, since the inner wall protection member 60 has the portions 62 as the protruding portions, gaps are formed between the inner wall protection member 60 and the inner wall surface 7. Accordingly, air in regions between the inner wall surface 7 and the inner wall protection member 60 can be vacuumed quickly. Note that although each portion 62 in the present embodiment is a protruding portion folded at an acute angle, the tip of the protruding portion may be formed in a flat or curved shape.

Third Embodiment

Figure 7:
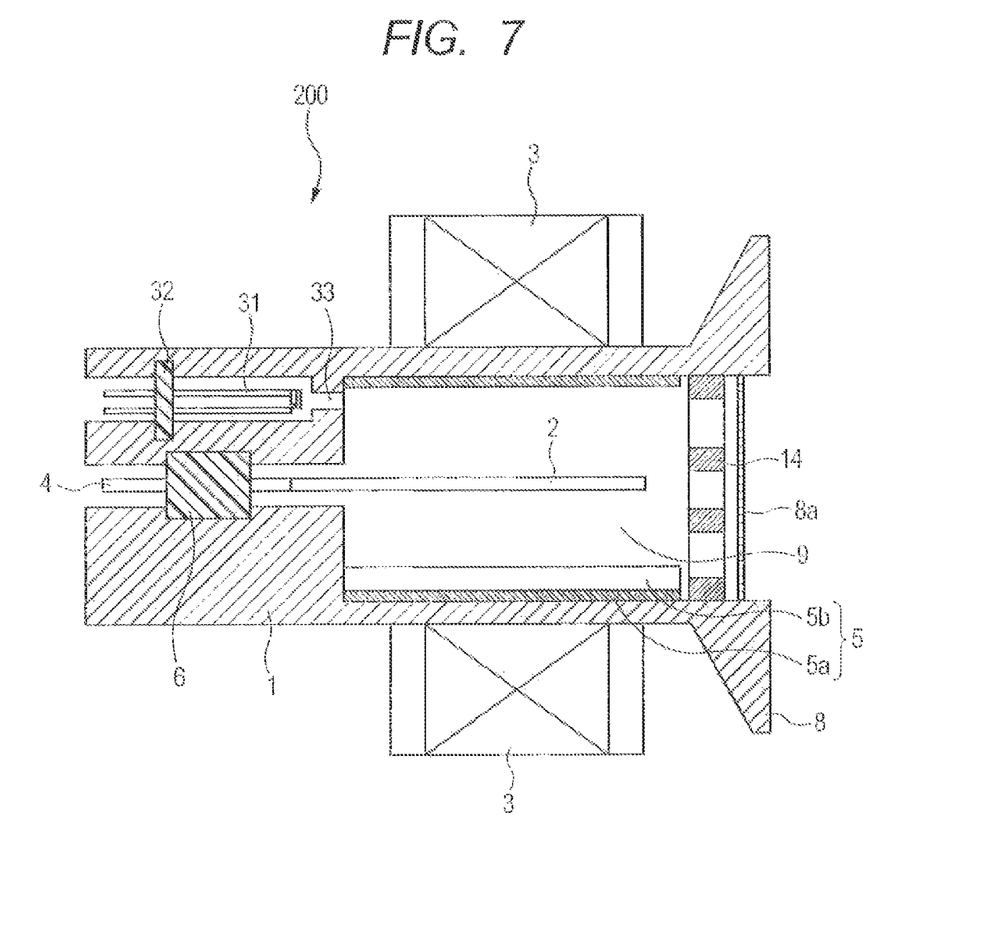
FIG. 7 is a cross-sectional view showing a cold cathode ionization vacuum gauge according to another embodiment of the present invention.

FIG. 7 is a schematic cross-sectional view of a cold cathode ionization vacuum gauge 200 according to a third embodiment of the present invention. Components and members similar to those in the first embodiment described above are denoted by the same reference numerals, and detailed description thereof is omitted. The cold cathode ionization vacuum gauge 200 according to the present embodiment is a so-called combination vacuum gauge incorporating a Pirani gauge filament 31 fixed to an insulating member 32. The cold cathode ionization vacuum gauge 200 is configured to function as a Pirani vacuum gauge to perform measurement in a low to medium vacuum range and function as a cold cathode ionization vacuum gauge to perform measurement in a medium to high vacuum range, thereby capable of measurement in a low vacuum to a high vacuum.

The inner wall protection member 5 is attached to the cold cathode ionization vacuum gauge according to the present embodiment, but an inner wall protection member according to the present invention, such as the inner wall protection member 60 according to the second embodiment can be attached as a matter of course. In the case where the combination vacuum gauge is equipped with the inner wall protection member 5 or the like as described above, too, advantageous effects similar to those by the first embodiment mentioned above cars be achieved.

Meanwhile, the gauge head container (cathode) 1 is provided with an air passage hole 33 through which the Pirani gauge filament 31 and the discharge space 9 communicate with each other. In the present embodiment, the inner wall protection member 5 is desirably mounted such that the trigger electrode portion 5b does not close the air passage hole 33.

Other Embodiments

In each embodiment described above, the rod-shaped electrode 2 is a anode, and the gauge head container 1 surrounding it is a cathode. However, the rod-shaped electrode 2 may be a cathode, and the gauge head container 1 may be a anode. In other words, the present invention simply needs to use two electrodes disposed such that one of the electrodes is surrounded by the other electrode to thereby form a discharge space therebetween.

What is claimed is:
1. A cold cathode ionization vacuum gauge, comprising:
two electrodes disposed such that one of the electrodes is surrounded by the other electrode having a cylindrical shape to thereby form a discharge space therebetween; and
an electrode protection member disposed in the discharge space and configured to protect an inner wall surface of the other electrode in a circumferential direction,
wherein the electrode protection member includes a protection portion formed of an elastic member having electric conductivity and a plate-shape, the elastic member being capable of elastic deformation into a cylindrical shape and being capable of changing the diameter of the cylindrical shape in accordance with the elastic deformation, and
wherein the protection portion is elastically deformed along a shape of the inner wall surface in the circumferential direction, presses the inner wall surface of the other electrode, and is to be electrically connected to the other electrode.
2. The cold cathode ionization vacuum gauge according to claim 1, wherein the electrode protection member further includes:
a trigger electrode portion connected to the protection portion, and protruding toward the one electrode under a state that the protection portion is covering the other electrode.
3. The cold cathode ionization vacuum gauge according to claim 2, wherein a plurality of the trigger electrode portions are provided.
4. The cold cathode ionization vacuum gauge according to claim 1, wherein the electrode protection member includes a protruding portion being in contact with the inner wall surface under a state that the electrode protection member is covering the other electrode.
5. An electrode protection member,
wherein the electrode protection member has electric conductivity and is disposed in a discharge space between two electrodes, the two electrodes being disposed such that one of the electrodes is surrounded by the other electrode having a cylindrical shape to thereby form the discharge space,
wherein the electrode protection member is configured to protect an inner wall surface of the other electrode in a circumferential direction, and
wherein the electrode protection member comprises a protection portion formed of an elastic member having electric conductivity and a plate-shape, the elastic member being capable of elastic deformation into a cylindrical shape and being capable of changing the diameter of the cylindrical shape in accordance with the elastic deformation, and
wherein the protection portion is elastically deformed along a shape of the inner wall surface in the circumferential direction, presses the inner wall surface of the other electrode, and is to be electrically connected to the other electrode when disposed in the discharge space.
6. The electrode protection member according to claim 5, further comprising:
a trigger electrode portion connected to the protection portion, and protruding toward the one electrode under a state that the protection portion is covering the other electrode.
7. The electrode protection member according to claim 6, wherein a plurality of the trigger electrode portions are provided.

8. The electrode protection member according to claim 5, comprising a protruding portion being in contact with the inner wall surface under a state that the electrode protection member is covering the other electrode.

* * * * *